UNITED STATES PATENT OFFICE.

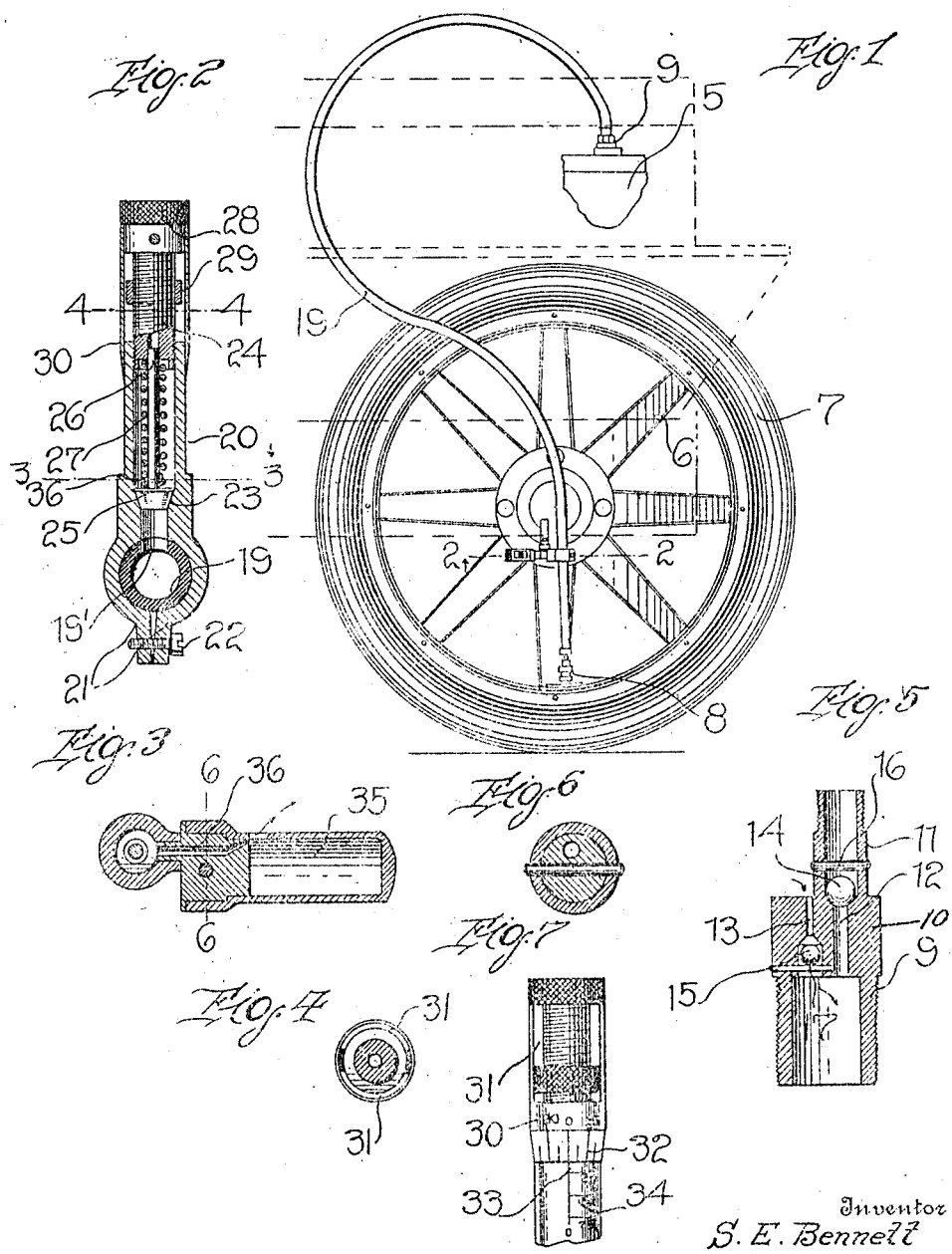

SAMUEL E. BENNETT, OF SOUTH WILLIAMSPORT, PENNSYLVANIA.

INFLATING DEVICE.

1,105,608.  Specification of Letters Patent.  Patented Aug. 4, 1914.

Application filed November 7, 1913. Serial No. 799,784.

*To all whom it may concern:*

Be it known that I, SAMUEL E. BENNETT, a citizen of the United States, residing at South Williamsport, in the county of Ly-coming and State of Pennsylvania, have invented certain new and useful Improvements in Inflating Devices, of which the following is a specification, reference being had to the accompanying drawings.
This invention relates to tire inflating devices and succinctly stated has for its principal object to provide a device of this character whereby one of the engine cylinders of an automobile or other motor vehicle is utilized as a pump, the invention including an improved pressure regulator to prevent over-inflation of the tire, and an automatically operated alarm device.

The invention has for another and more specific object to provide a pressure regulator, means for removably securing the same upon the air conducting tube, said regulator embodying a spring seated valve, and means for adjusting the valve spring and thereby predetermining the pressure of air in the wheel tire.

My invention has for a further object to produce a tire inflating device which consists of comparatively few parts all of simple form and therefore capable of manufacture at small cost and the device as a whole being highly efficient and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is an elevation illustrating my invention in its preferred form as applied in actual use. Fig. 2 is an enlarged longitudinal section through the pressure regulating device taken on the line 2—2 of Fig. 1. Fig. 3 is a section taken on the line 3—3 of Fig. 2. Fig. 4 is a section taken on the line 4—4 of Fig. 2. Fig. 5 is an enlarged detail section through the plug which is mounted in the spark plug opening of the engine cylinder. Fig. 6 is a detail section taken on the line 6—6 of Fig. 3. Fig. 7 is a detail fragmentary elevation of the air pressure regulator.

Referring in detail to the drawings, 5 designates one of the engine cylinders of an automobile or other motor vehicle, and 6 indicates one of the wheels of said vehicle which is provided with the usual pneumatic tire 7. The inner inflatable tube of the tire is equipped with an inflating valve indicated at 8, which may be of any ordinary or approved construction. A plug 9 is adapted to be threaded into the spark plug opening of the engine cylinder 5. This plug includes a tubular exteriorly threaded portion having a head 10 formed upon one end. This head is provided with a nipple 11 which extends longitudinally therefrom and with the bore of which an opening 12 formed on the head communicates. This head is also provided with a second opening 13, one end of which opens to the atmosphere upon the end face of the head. In the opening 13 and the nipple 11 ball check valves, designated by the numerals 15 and 14 respectively, are arranged. Transversely disposed threaded pins 17 and 16 are removably engaged in the tubular portion of the plug and in the stem 11 to retain said valves in place. The end of the stem 11 is provided with exterior screw threads for engagement by the threads of a coupling sleeve on one end of the air hose or tube 19. The other end of this tube is adapted for removable engagement upon the stem of the tire inflating tube 8. From the above description it will be apparent that in the operation of the engine piston in its cylinder, when said piston moves in one direction, air is drawn into the cylinder through the opening 13. When the movement of the piston is reversed, the ball valve in said opening is forced outwardly to close communication between the interior of the cylinder and the atmosphere while the air in the cylinder is driven therefrom by the piston through the opening 12 and the nipple 11 into the tube 19 which conducts the same to the inflating valve 8 through which the air is supplied to the inner tube of the tire. The flexible tube 19 is provided at a suitable point with an opening, indicated at 19'.

20 designates a valve casing which is provided upon one end with spaced clamping plates 21. These plates are adapted for engagement upon opposite sides of the tubing 19 and the clamping screw or bolt 22 has threaded engagement in the plates 21, whereby said plates may be drawn together and securely clamped upon the tube. One of the open ends of the valve casing 20 is thus held in registering relation with the opening 19' in the tubing 19. The valve casing 20 adjacent the end which is provided with the plates 21 is formed with an internal valve seat 23. This valve casing is also provided with internal threads to receive the adjustable rod or stem 24. This rod is formed with a central longitudinal bore to receive the stem 26 of the valve member 25. Upon the valve stem 26 a coil spring 27 is arranged, one end of said spring bearing against the valve head while the other end thereof is seated in an annular recess formed in the end of the rod 24. The other end of the rod 24 is formed with a head 28 and upon said rod a lock nut 29 is threaded for engagement with the end of the valve casing 20 to hold the said rod 24 in its adjusted position. A sleeve 30 is loosely engaged at one of its ends upon the periphery of the valve casing 20, the other end of said sleeve being fixed to the head 28 on the outer end of the threaded rod 24. This sleeve, intermediate of its ends, is provided with opposed openings 31 for the accommodation of the fingers, whereby the lock nut 29 may be readily manipulated. The end of the sleeve 30 which is engaged upon the valve casing has a circular series of graduations indicated at 32, suitably marked thereon, the same being numbered from zero to twenty-five. Thus, one complete rotation of the threaded rod 24 indicates an adjustment of the valve spring which will effect an increase or decrease of twenty-five pounds in the pressure to be supplied to the tire tube as the case may be. The outer surface of the valve casing 20 is marked with a longitudinal line, indicated at 33, with respect to which the graduations 32 on the end of the sleeve are adapted to be disposed. The valve casing is also provided with the additional graduations 34 extending at right angles to the line 33 and numbers indicating variations in air pressure are stamped or otherwise indicated opposite these latter graduations. It is thus apparent that when the rod 24 is turned in the valve casing, the sleeve 30 which is fixed to said rod will move longitudinally upon the periphery of the valve casing and by noting the position of the end of the sleeve with relation to the graduations 34, the user may readily ascertain the exact air pressure in the tire tube before the release valve will be forced from its seat to permit of the escape of air from the tubing 19.

In order to provide an alarm device for acquainting the user with the fact that the maximum air pressure has been supplied to the tire. I provide an air whistle generally indicated by the numeral 35 which is mounted upon the valve casing and receives air from the transverse bore or passage 36 which communicates with the interior of the valve casing at a point adjacent to the valve seat 23 upon the opposite side thereof with respect to the tubing 19. It will thus be seen that immediately upon opening of the valve 25, the air escaping from the tubing 19 in the valve casing will pass into the tubular whistle and escape from the orifice thereof, and in such escape emit a shrill whistle or noise. The operator will then stop the operation of the engine, remove the plug 9 from the cylinder and insert the spark plug therein.

From the foregoing, it is believed that the construction and manner of operation and the several advantages of my invention will be clearly and fully understood.

The device is extremely simple in its construction, may be manufactured at small cost, is capable of easy and quick application or arrangement in position for use and effectually obviates all liability of over-inflation of the tire tube.

The pressure regulator and alarm device may be readily removed from the air tube when it is necessary to supply new tubing or make any repairs to the device.

My invention is particularly desirable for use in the inflation of pneumatic wheel tires such as are used upon automobiles, motorcycles, and similar vehicles.

The invention when not in use may be compactly stored away in a very small space.

It will be understood that it may be found necessary to change the form and construction of the cylinder plug 9 in various minor respects in order to render the invention adaptable for use in connection with the different kinds of automobiles now in common use. The invention is also susceptible of a great many other modifications in the form, proportion and arrangement of the several elements and I therefore reserve the right to resort to all such legitimate changes as may be fairly embodied within the spirit and scope of the invention as claimed.

I claim:

The herein described tire inflating device comprising in combination with an air tube provided with an opening, a pressure regulator including a casing open at both ends, means on one end of the casing to clamp the same upon the tube in communication with the opening thereof; a spring seated valve arranged in one end of said casing, a rod threaded in the other end of said casing, one end of the valve spring bearing against said rod, a sleeve permanently fixed at one of its ends to the other end of said rod and extending longitudinally thereof, the other end of said sleeve being slidably engaged upon the periphery of the valve casing, the latter end of said sleeve and the valve casing being provided with indicating graduations, and a lock nut threaded upon said rod and adapted for binding engagement with the end of the casing to secure the rod in its adjusted position, said sleeve being provided with opposed finger receiving slots whereby said lock nut may be manipulated.

In testimony whereof I hereunto affix my signature in the presence of two witnesses.

SAMUEL E. BENNETT.

Witnesses:
M. C. LYDDANE,
D. W. GALL.